(12) United States Patent
Richter (10) Patent No.: US 9,610,710 B2
(45) Date of Patent: Apr. 4, 2017

(54) ARRANGEMENT FOR RECEIVING A CASTING MOLD WITH COAXIAL DRIVE AND METHOD THEREFOR

(75) Inventor: Günter Richter, Altenkirchen (DE)

(73) Assignee: BODO RICHTER, Altenkirchen (DE)

( * ) Notice: Subject to any disclaimer, the term of this patent is extended or adjusted under 35 U.S.C. 154(b) by 464 days.

(21) Appl. No.: 14/008,065

(22) PCT Filed: Mar. 29, 2012

(86) PCT No.: PCT/EP2012/055627
§ 371 (c)(1),
(2), (4) Date: Sep. 27, 2013

(87) PCT Pub. No.: WO2012/130934
PCT Pub. Date: Oct. 4, 2012

(65) Prior Publication Data
US 2014/0013568 A1 Jan. 16, 2014

(30) Foreign Application Priority Data

Mar. 29, 2011 (DE) .................. 10 2011 001 615
Mar. 29, 2011 (DE) .................. 20 2011 000 708 U (51) Int. Cl.
*B25B 1/24* (2006.01)
*B29C 31/00* (2006.01)
*B22D 17/26* (2006.01)
*B29C 49/56* (2006.01)
(Continued)

(52) U.S. Cl.
CPC ............ *B29C 31/006* (2013.01); *B22D 17/26* (2013.01); *B29C 33/24* (2013.01); *B29C 49/56* (2013.01); *B30B 1/323* (2013.01); *B29C 2049/566* (2013.01); *Y10T 29/49817* (2015.01)

(58) Field of Classification Search
CPC .................................... B25B 5/14; B25B 1/00
See application file for complete search history.

(56) References Cited

U.S. PATENT DOCUMENTS 3,862,596 A     1/1975  Putkowski
7,568,683 B1 *  8/2009  Lovas ................... B25B 1/2463
                                                          269/43
7,585,168 B2    9/2009  Kato et al.
(Continued)

FOREIGN PATENT DOCUMENTS

CN         1753771 A       3/2006
CN         101132897 A     2/2008
(Continued)

*Primary Examiner* — Lee D Wilson
(74) *Attorney, Agent, or Firm* — Lucas & Mercanti, LLP; Klaus P. Stoffel (57) ABSTRACT

An arrangement for receiving a multi-part casting mold, in particular an at least two-part blow mold. A drive unit for displacing locking elements has a main cylinder with a main piston and a travel cylinder with a travel piston, wherein the travel cylinder is connected with the main piston of the main cylinder and is movable therewith. The travel piston has a piston rod, which is connected with the locking element and is mounted concentrically displaceably in the main piston. In the operating condition of the molding process, the travel piston abuts on the main piston, wherein the main cylinder provides the locking force to keep the mold closed during the molding process.

12 Claims, 11 Drawing Sheets

(51) Int. Cl.
*B30B 1/32* (2006.01)
*B29C 33/24* (2006.01)

(56) References Cited

U.S. PATENT DOCUMENTS

| | | | | |
|---|---|---|---|---|
| 9,004,472 | B2* | 4/2015 | Schmidt | B25B 1/103 |
| | | | | 269/136 |
| 2002/0180132 | A1 | 12/2002 | Kubota et al. | |
| 2006/0163776 | A1* | 7/2006 | Kato | B29C 45/1748 |
| | | | | 264/328.1 |
| 2008/0145471 | A1* | 6/2008 | Richter | B22D 17/26 |
| | | | | 425/541 |
| 2014/0013568 | A1* | 1/2014 | Richter | B22D 17/26 |
| | | | | 29/426.2 |

FOREIGN PATENT DOCUMENTS

| | | |
|---|---|---|
| CN | 201165948 Y | 12/2008 |
| DE | 102004059141 A1 | 6/2006 |
| DE | 102005010396 A | 9/2006 |
| WO | 2006094861 | 9/2006 |

* cited by examiner

ARRANGEMENT FOR RECEIVING A CASTING MOLD WITH COAXIAL DRIVE AND METHOD THEREFOR

The present application is a 371 of International application PCT/EP2012/055627, filed Mar. 29, 2012, which claims priority of DE 10 2011 001 615.5, filed Mar. 29, 2011 and DE 10 2011 000 708.1, filed Mar. 29, 2011, the priority of these applications is hereby claimed and these applications are incorporated herein by reference.

BACKGROUND OF THE INVENTION

The invention concerns an arrangement for receiving a casting mold. Further, the invention concerns an associated operating method.

Arrangements for receiving casting molds are known that have a base frame, on which two plate-shaped mold fixing elements are arranged, wherein at least one hydraulic cylinder is provided which, via a compensating mechanism, brings about a uniform movement of displacement of the mold fixing plates. Furthermore, a locking system is provided for fixing the mold fixing plates in a predetermined position, at least during the casting process. Such arrangements are also referred to as rodless closing installations or rodless closing units.

Arrangements of this kind are advantageous in so far as, when opening the casting mold and subsequently removing a product, there are no bars obstructing the operational process in a disruptive manner. A further advantage is given when changing the casting mold, since in such arrangements, the assembly and disassembly of the casting molds can be effected in a trouble-free and quick manner and thus also in an economically advantageous way.

From document WO 2006/094861 A1, an arrangement is known for receiving a casting mold, in which the locking elements cooperate with the mold fixing elements and fix the same in their position during the casting process. Such arrangement can be improved with regard to its cost-effectiveness, in particular with regard to the drive mechanisms. In every opening and closing process, the locking elements have to travel long displacement paths and usually have to absorb strong locking forces during the casting process, wherein to this end, one single hydraulic drive is made use of. Due to the long displacement paths, relatively high hydraulic capacities have to be moved back and forth between the cover side and the piston side of the associated drive cylinder. Correspondingly, plenty of time is required for the displacement paths to be traveled and the overall effort made in respect to hydraulic is great.

SUMMARY OF THE INVENTION

It is the object of the invention to provide an arrangement, in which an improved cost-effectiveness is achieved.

According to the invention, the drive unit, which displaces the locking element, has a main cylinder with a main piston and a travel cylinder with a travel piston, wherein the travel cylinder is connected with the main piston of the main cylinder and is movable therewith. The piston rod of the travel piston is connected with the locking element, or rather the locking element itself constitutes the piston rod, and is concentrically and displaceably mounted in the main piston. In the operating condition of the molding process, the travel piston abuts on the main piston, wherein the main cylinder provides the locking force to keep the mold closed during the molding process.

Accordingly, the invention makes use of a main cylinder, which serves to absorb the locking force and is, on the other hand, used to set up a plurality of different mold fitting heights. For moving the drive of the travel piston in the travel cylinder only a minor effort is required in order to move the locking element along its path. Preferably, the operating resource for the travel cylinder is pressurized air. The main piston in the main cylinder requires only a short stroke when combining the mold halves for the casting mold or when opening the casting mold, such that to this end, only a small capacity of hydraulic operating resources, preferably hydraulic oil, is necessary. Thus, the main cylinder can be optimally adapted to the overall arrangement. The hydraulic equipment required is kept low and only a small amount of energy is spent. Due to the compact arrangement of the main cylinder and the travel cylinder, furthermore, a compact arrangement is achieved.

According to a further aspect of the invention, a method for operating the arrangement is provided. When changing the casting mold, a set-up process for this casting mold is effected, in particular with regard to the mold fitting height, wherein the main piston of the main cylinder is brought into an initial position, from which the main piston has to execute only small stroke movements.

Preferably, the arrangement and the method are used in blow molding.

Furthermore, the arrangement is preferably used for relatively large objects to be produced in a casting mold process, in particular in a blow mold process. The dimensions of an object herein is in a range of 200 to 10,000 liters. Typical locking forces are within a range of 80 to 600 tons and, according to the number of drives and main cylinders used, are apportioned to these, for example in such a way that every main cylinder applies a locking force in the range of 20 tons to 100 tons.

In the case of large casting molds, the arrangement according to the invention is relatively complex and cost-intensive, wherein a substantial economic factor is the hydraulic for the main cylinder or the main cylinders and herein, in particular their dimensions with regard to their lengths. Herein, a substantial measurement is the minimum mold fitting height and the maximum mold fitting height for the blow or casting mold. The mold fitting height of a casting mold corresponds to the distance between the mold fixing elements in the case of a closed casting mold. An embodiment of the invention provides that in the case of a structural form of the installation with a minimum mold fitting height and a maximum mold fitting height for a blow or casting mold, the main cylinder is dimensioned such that the maximum stroke of the main piston corresponds to the difference of the maximum mold fitting height and the minimum mold fitting height plus a reserve path. Considering these structural dimensions, for different blow or casting molds, an optimal structural form of the installation can be chosen, in which the hydraulic for applying the locking force of the blow or casting mold has a compact structure and is highly cost-effective.

The embodiments of the invention are outlined in the following with reference to the drawings. Herein.

BRIEF DESCRIPTION OF THE DRAWING

DETAILED DESCRIPTION OF THE INVENTION

Figure 1:
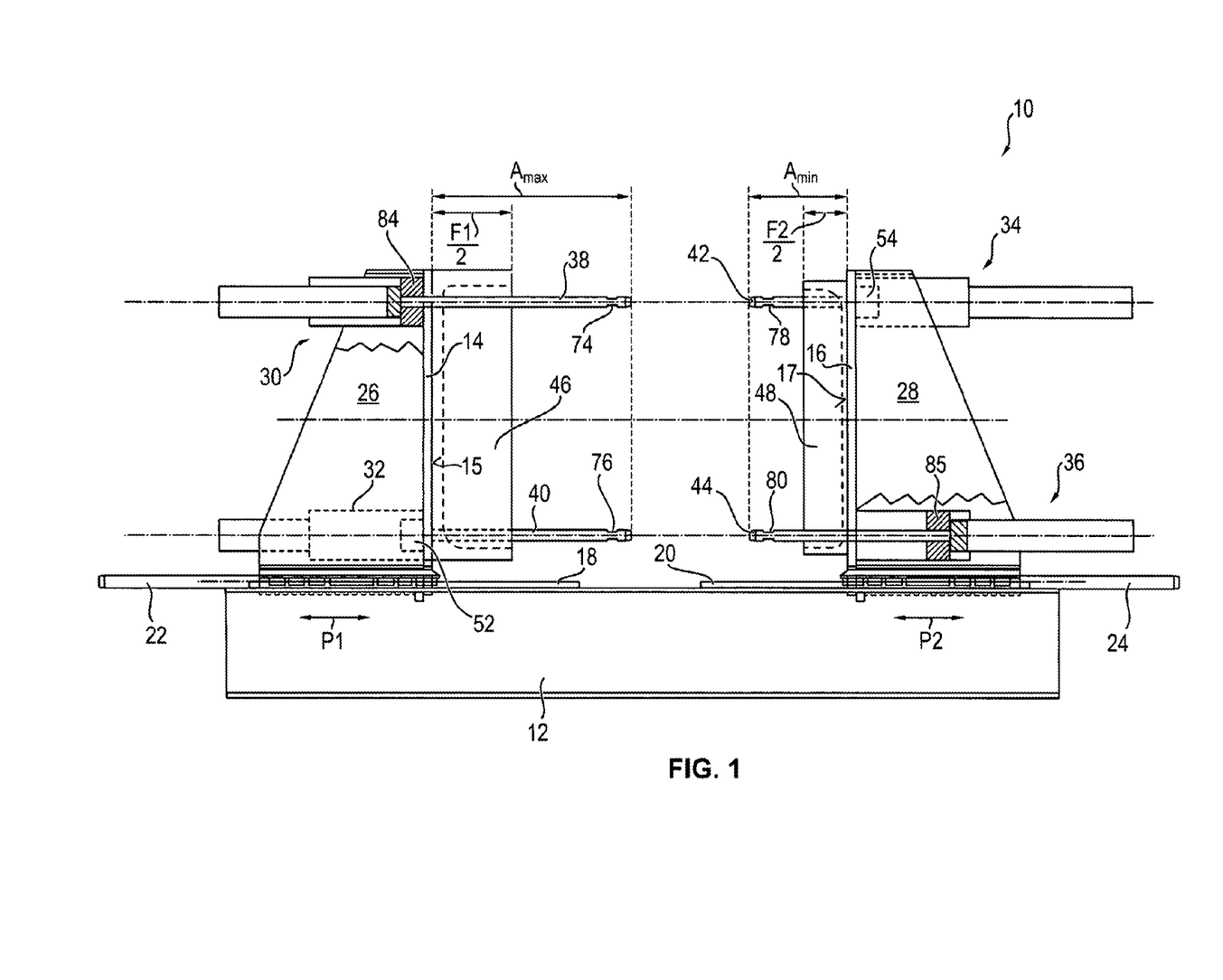
FIG. 1 illustrates a side view of an arrangement for receiving different two-part casting molds with each of the locking elements being fully extended.
Figure 2:
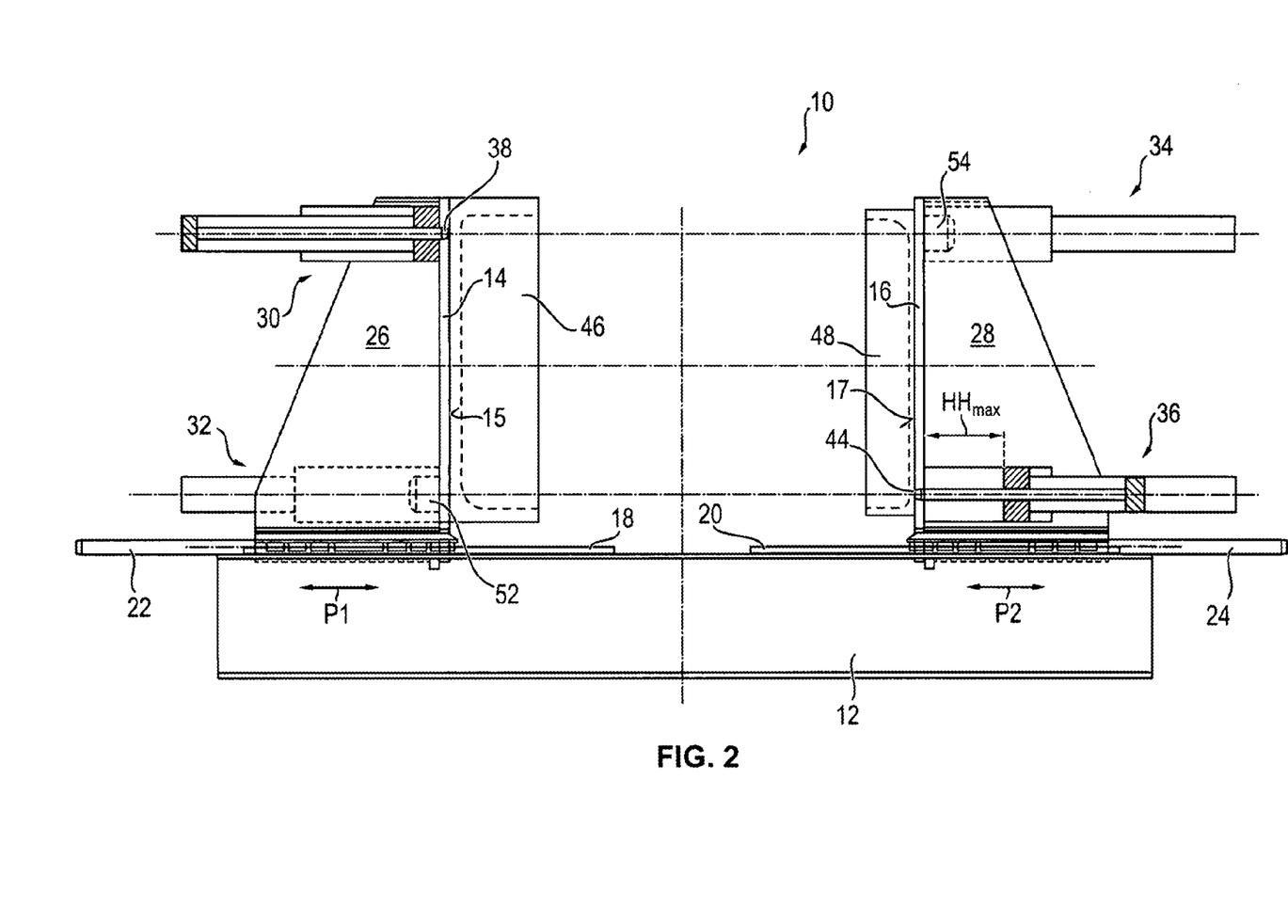
FIG. 2 illustrates a side view of an arrangement according to FIG. 1 with the locking elements being fully retracted.
Figure 3:
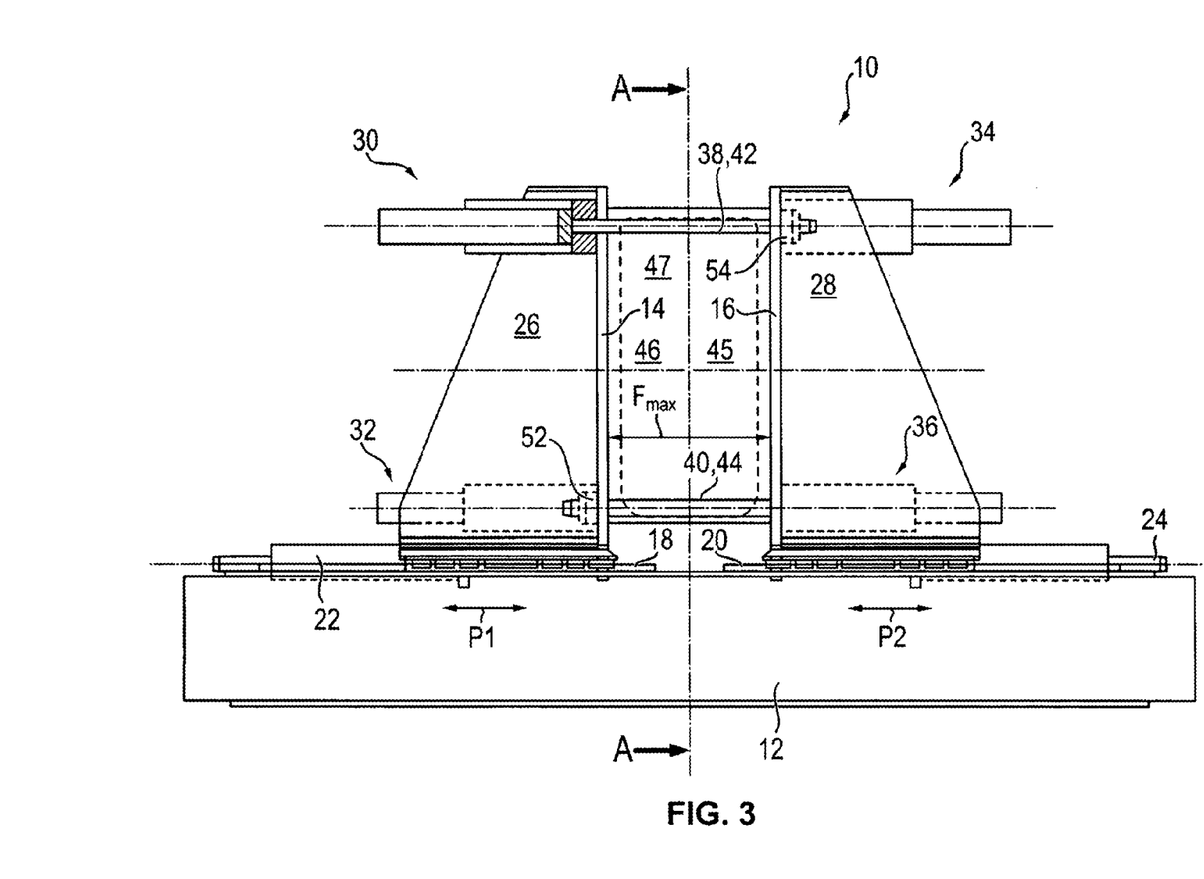
FIG. 3 shows a side view of the arrangement according to FIGS. 1 and 2, in which the locking elements are illustrated to be in a closed and locked form in the case of the reception of a largest possible casting mold.

Each of FIGS. 1 to 3 shows a side view of an arrangement 10, also referred to as closing unit, for receiving casting parts of a two-part casting mold, which is used in a hollow-body blowing installation for producing blow molded plastic parts. This arrangement 10 has no tie rods hindering handling during the opening and closing of the casting mold for removing the blow molded part or during a mold change.

In FIG. 1, the arrangement 10 comprises a base frame 12, on which plate-shaped mold fixing elements 14, 16 are arranged, each of which is inserted in two guide rails, the guide rails 18, 20 whereof are visible. By means of these guide rails 18, 20, the movement of the mold fixing elements 14, 16 is guided such that their front sides 15, 17 can be displaced in the direction of arrows P1 and P2, wherein these front sides 15, 17 are aligned approximately parallel during the displacement operation and after the displacement operation.

The arrangement 10 has two hydraulic cylinders 22, 24 serving to drive the mold fixing elements 14, 16 in the direction of arrows P1 and P2 for displacing them. The hydraulic cylinders 22, 24 are connected with an hydraulic system of the hollow-body blowing installation and are controlled via valves by means of a control means not illustrated. Each of the mold fixing elements 14, 16 has two stiffening elements 26, 28, which are mounted to the rear side of the mold fixing elements 14, 16, whereof, respectively, one of the stiffening elements 26, 28 is visible in FIG. 1.

At the rear side of the mold fixing elements 14, 16 drives 30, 32, 34, 36 for locking elements 38, 40, 42, 44 are arranged. The drives 30 and 36 are illustrated in the form of sectional drawings. The structure and function of the drives 30 to 36 are outlined by way of example in respect of the drive 30 further below with regard to FIGS. 5 to 11. The drives 30 to 36 serve to retract and extend the locking elements 38 to 44 into a fully or partially retracted or extended position.

The mold fixing elements 14, 16 hold a multi-part casting mold, two mold halves 46, 48 of which are illustrated having different mold fitting heights F1/2 and F2/2 for the resulting casting mold. As shown in FIG. 3 by means of the casting mold 47, where the mold is incorporated in a device according to FIG. 1, the distance of the front sides 15, 17 of the mold fixing elements 14, 16 in the case of a closed casting mold is referred to as the mold fitting height F1, F2 of a casting mold. In FIG. 1 (and also in FIG. 2), only the halves 46, 48 of two different casting molds are respectively illustrated. On the left-hand side of FIG. 1, the mold half 46 of a casting mold having the maximum mold fitting height Fmax=F1 is illustrated, whereas on the right-hand side of FIG. 1, the mold half 48 of a casting mold having the minimum mold fitting height Fmin=F2 is shown. With respect to each of these maximum or minimum mold fitting heights Fmax or Fmin, respective positions of the main piston 84 or 85 of the associated drive units 30 or 36 of the locking elements 38 or 44 are shown in the drawing. As mentioned before, a more detailed description of the drive units 30 to 36, in which also the relation between the position of the respective main piston and the mold fitting heights is outlined, will be given further below in the description of FIGS. 5 to 11.

In FIG. 1, each of the locking elements 38 to 44 is illustrated to be in a fully extended position. Depending on the position of the respective main piston, for example of the main pistons 84 or 85, respectively, a maximum extension height Amax and a respective minimum extension height Amin results. The difference between the maximum extension height Amax of the locking elements 38 and 40 and minimum extension height Amin of the locking elements 42 and 44 is attributable to the fact that the mold fixing element 14 is adapted to receive the casting mold having the maximum mold fitting height Fmax (only one mold half 46 having half of the mold fitting height Fmax/2=F1/2 being illustrated), whereas the mold fixing element 16 has been prepared such as to receive the casting mold having the minimum mold fitting height Fmin (only one mold half 48 having half of the mold fitting height Fmin/2=F2/2 being illustrated).

In respect to every locking element 38 to 44, in the mold fixing element 14, 16 arranged on the opposite side, a locking device 50, 52, 54, 56 (only 52 and 54 are shown in FIG. 1) is provided that has a form that is complementary to the cross-section of the locking elements 38 to 44, into which the front part of the respective locking element 38 to 44 can be inserted to thus engage into the mold fixing element 14, 16 arranged on the opposite side. By way of example with reference to FIG. 4, two locking devices 54, 56 are described further below with respect to their position and function.

In the embodiment of the arrangement 10 shown in FIG. 1, for closing the casting mold with the respective mold halves 46 and 48, both of the mold fixing elements 14, 16 are displaced, respectively, in the direction of the arrows P1, P2 towards the respectively facing mold fixing element 14, 16 to such an extent that the two mold halves 46, 48 that are respectively attached to one of the mold fixing elements 14, 16 are closed to form a complete casting mold. Subsequently, the locking elements 38 to 44 are extended by means of the drives 30 to 36 to such an extent that the locking elements 38 to 44 engage into the respective locking device 50 to 56 arranged on the opposite side to get locked with the respective mold fixing element 14, 16. Hereinafter, moving the locking elements 38 to 44 out of the locking devices 54 to 60 from this locked and fixed position is no longer possible. The drive-end fixation of the locking elements 38 to 44 will be described further below with reference to FIGS. 5 to 11.

Locking the locking elements 38 to 44 with the locking devices 50 to 56 in the two mold fixing elements 14, 16 serves to absorb the forces that act outwardly upon the mold fixing elements 14, 16 in the casting mold process as well as to prevent the mold fixing elements 14, 16 from being removed and thus the mold halves 46 and 48, respectively, from being separated from one another during the casting mold process. To this end, the locking elements 38 to 44 are mounted horizontally and vertically offset to one other around the mold halves 46, 48. By providing a plurality of locking elements 38 to 44 around the casting mold it is effectively prevented that in the molding process, the mold fixing elements 14, 16 are separated or that distortion occurs.

In FIG. 2, the arrangement according to FIG. 1 is illustrated, wherein identical elements have identical reference signs, which also applies to the further Figures. In this embodiment shown in FIG. 2, the locking elements 38 to (merely 38 and 44 are illustrated) have been completely retracted, such that they disappear in the front sides 15, 17 of the mold fixing elements 14, 16. As already shown in FIG. 1, the mold fixing elements 14, 16 themselves are still in a state displaced apart from one another. In this position, the respective entire casting mold with the mold halves 46 and 48 can be removed from the arrangement 10 and a new casting mold can be inserted into the arrangement 10.

In FIG. 3, the arrangement according to FIGS. 1 and 2 is shown in a closed operating condition. In contrast to FIGS. 1 and 2, here, the mold half 45 shown on the right-hand side is identical in its dimension with mold half 46, wherein together they constitute a casting mold 47 having a maximum mold fitting height Fmax. The mold fixing elements 14, 16 have been displaced into a casting position, in which for example in the blow mold process, an inserted casting article is blown. Therefore, the two mold halves 45, 46 connected with the mold fixing elements 14, 16 constitute the closed largest possible casting mold 47. Here, the locking elements 38 to 44 are extended to such an extent that they protrude into the locking devices 50 to 56 provided in the front side 15, 17 of the mold fixing element 14, 16 arranged on the opposite side, where they are locked.

Figure 4:
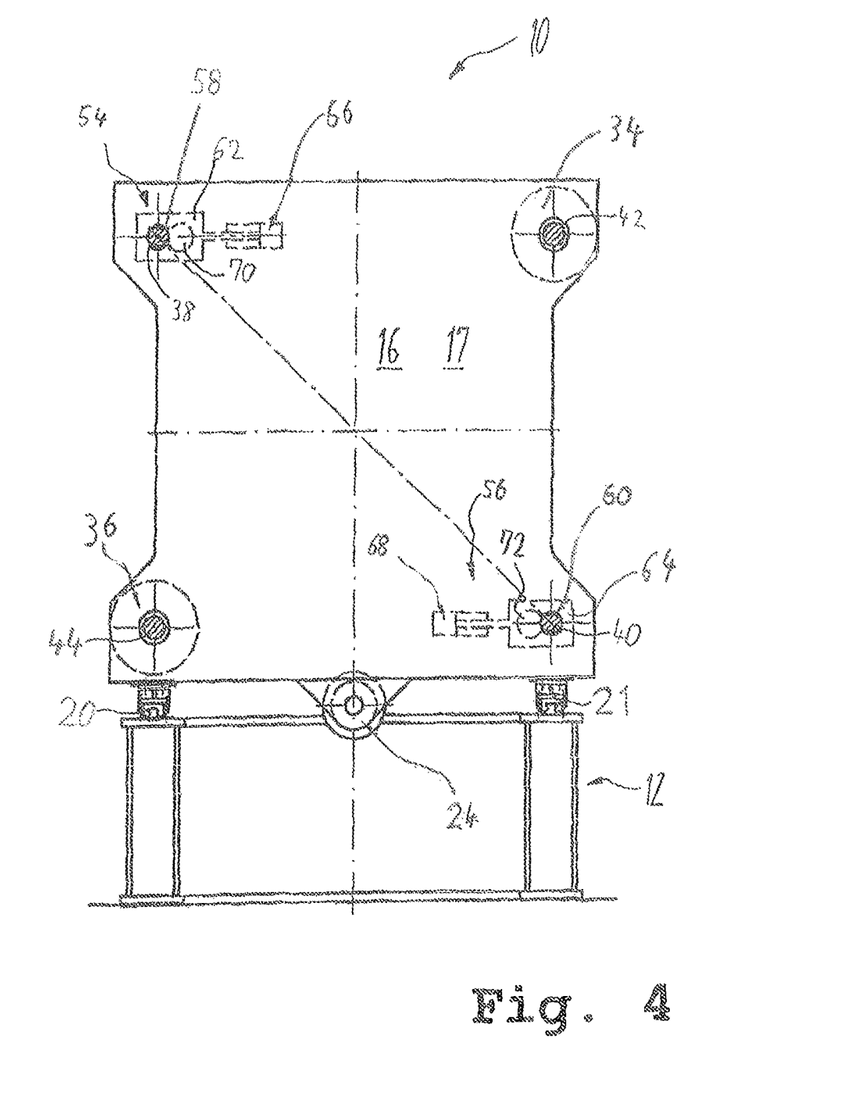
FIG. 4 shows the arrangement according to FIG. 3 along sectional line A-A.

FIG. 4 is an illustration of the arrangement 10 along sectional line A-A in FIG. 3, however, without casting mold 47. Here, the guide rails 20, 21 are visible, centrally of which the hydraulic cylinder 24 is arranged. Each of the locking elements 38, 40 protrude into the openings 58, 60 arranged on the opposite side and are locked mechanically by means of locking devices 54, 56. Each of the locking devices 54, 56 includes a metal plate 62, 64, whose movement is guided by means of at least one guide rail not shown. Further, each of the locking devices 54, 56 includes a drive 66, 68, which, in the present embodiment is an hydraulic drive. By means of the drive 66, 68, the metal plate 62, 64 can be moved back and forth. In the embodiment, the direction of movement is carried out to be horizontal and linear, however also other directions or ways of movement, for example a circular movement, are possible. The metal plate 62, 64 has a relatively large round opening section 70, 72, which steplike tapers towards one side.

For introducing the locking element 38, 40 into the opening 58, 60 of the locking device 54, 56, the metal plate 62, 64 is displaced by means of the drive 66, 68 in such a way that the large round opening 70, 72 is in accordance with the opening 58, 60 in the front side of the mold fixing element 16 and such that the locking element 38, 40 is guided into the mold fixing element 16 and through the metal plate 62, 64 of the locking device 54, 56. The locking element 38, 40 protruding into the opening 58, 60 and the groove 74, 76 (shown in FIG. 1) having been positioned in the opening 70, 72 of the metal plate 62, 64, the drive 66, 68 is operated such that the metal plate 62, 64 is displaced by the drive 66, 68, whereby the front end of the locking element 38, 40, in the top and bottom of which, respectively, a transversal groove 74, 76 is provided, engages into the metal plate 62, 64 such that the respective locking element 38, 40 at least may no longer be withdrawn from the opening 58, 60 of the mold fixing element 16.

In the mold fixing element 14, the locking elements 42, 44 get locked in the locking devices 50, 52 according to the same operating principle.

The locking elements 38 to 44 preferably are circular profiles made of an appropriate steel. The embodiment of the grooves 74, 76, 78, 80 (all shown in FIG. 1) can be realized in the form of one or two transversal grooves per locking element 38 to 44. It can also be carried out in the form of an annular groove.

The drives 66, 68 can also be carried out to be electric or pneumatic drives.

FIGS. 5 to 10 are detailed drawings of the drive 30 in different operating conditions.

Figure 5:
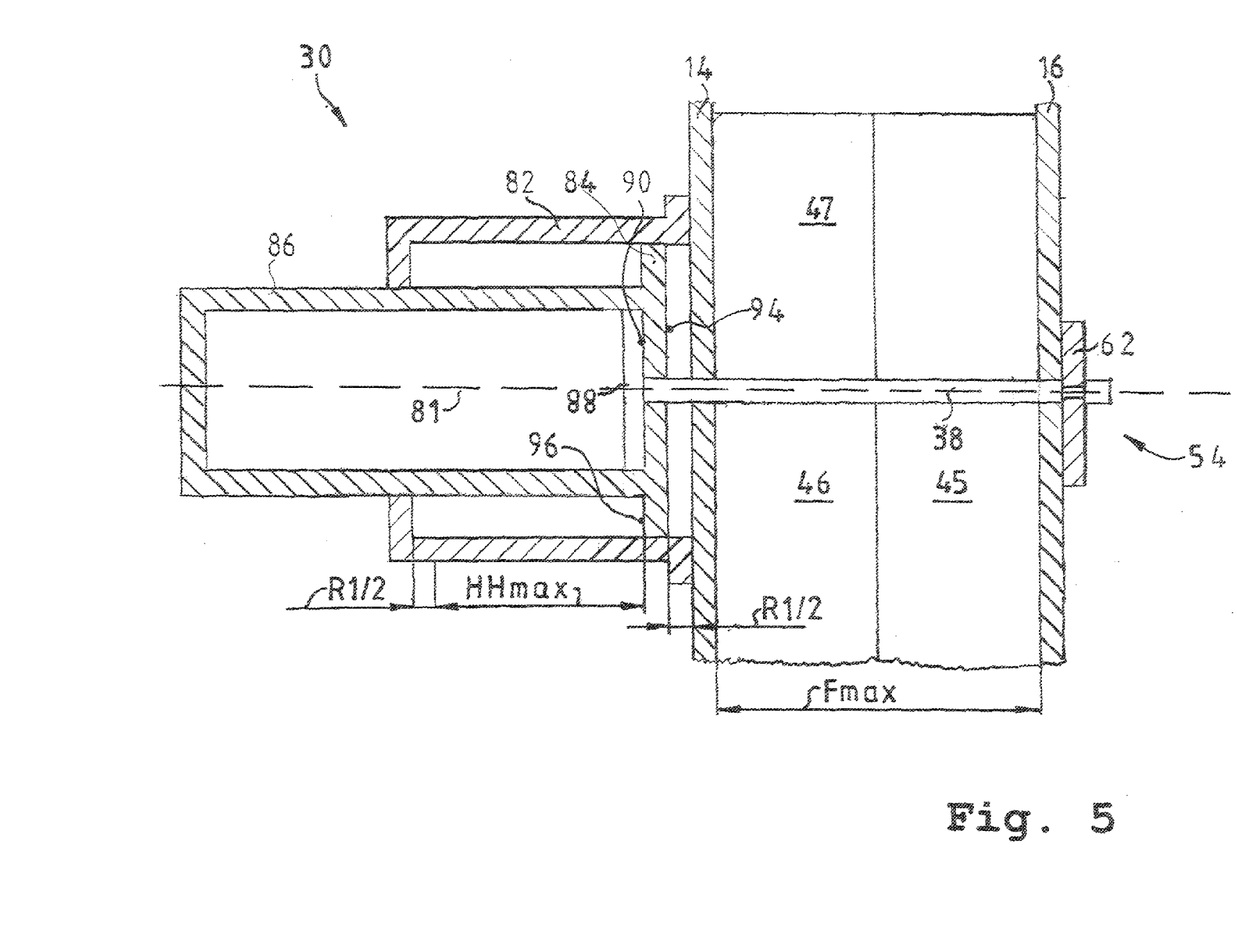
FIG. 5 illustrates a schematic view similar to FIG. 3 in the case of a largest possible casting mold in the locked condition.

In FIG. 5, the mentioned casting mold 47 having the maximum mold fitting height Fmax and being constituted of the two casting mold parts 45, 46 is shown in the locked condition. On the left-hand side of the casting mold 47, the drive 30 for the locking element 38 is situated, which in turn is locked in the locking device 54, whereof merely the metal plate 62 is visible. For reasons of clarity, some of the components have not been illustrated.

The drive 30 is embodied in the form of two connected cylinders, wherein one cylinder is flanged to the piston of the other cylinder. Accordingly, a main cylinder 82 is fixedly flanged onto the rear side of the mold fixing element 14 and is hydraulically operated. The inlets and outlets for the hydraulic liquid, for example hydraulic oil, transported by hydraulic conducts, which inlets and outlets have not been illustrated but are necessary for the operation, are arranged such that the maximum stroke HHmax plus a reserve path R1 is achieved by the main piston 84 of the main cylinder 82. In this example, the reserve path R1 distributes to both sides of the main cylinder 82 in equal portions into R1/2. Dividing the reserve path R1 in any other non-symmetrical manner is not possible. A portion of the reserve path R1 on the piston side 94 of the main piston 84 of the main cylinder for example serves to compensate for component tolerances of the arrangement 10, in order to achieve that the desired mold fitting heights Fmin, Fmax can be reliably realized as well as in order to provide a clearance. The reserve path R1 is in a range of 20 mm to 80 mm, preferably in the range of 30 mm to 50 mm.

The main piston 84 shown in FIG. 5 is arranged in the main cylinder 82 to be axially displaceable along the axis 81. A travel cylinder 86 is connected with the main piston 84 and for example mounted to the cover side 96 of the main piston such that it is moved along with the main piston 84. This also means that, as against the main cylinder 82, the travel cylinder 86 is arranged axially displaceable to the axis 81.

The travel cylinder 86 is preferably operated pneumatically. The inlets and outlets for the pressurized air transported by conducts, which inlets and outlets have not been illustrated but are necessary for the operation, are arranged such that, in the travel cylinder 86 over the respective length, a travel piston 88 is axially displaceable along the axis 81. Also, the connections of the conducts to the travel cylinder 86 are positioned such that the movement of the travel cylinder 86 in the main cylinder 82 is not impaired. For example, the conducts for supplying and releasing the pressurized air can be provided within the cylinder wall of the travel cylinder 86. In this embodiment, the locking element 38 in the form of a rod is fixedly connected with the piston side 90 of the travel piston 88. Alternatively, a piston rod can be connected with the travel piston 88, to which in turn the rod-shaped locking element 38 is connected. The locking element 38 is displaced along with the travel piston 88 and therefore is mounted to be axially movable against the main piston 84 and the mold fixing element 14. The hydraulic cylinder 82 and the travel cylinder 86 are controlled by means of a control unit not shown via valves and conducts. On the right-hand side of the casting mold 47, the locking device 58 described above is mounted to the mold fixing element 16. The metal plate 62 thereof is displaced such that the locking element 38 is locked.

The drive 30 is constructed in such a way that the locking element 38, the main cylinder 82, the main piston 84, the travel cylinder 86 and the travel piston 88 are arranged concentrically to the axis 81. As a result, the travel cylinder 86 acts like a cylinder rod in the main cylinder 82, whereas the locking element 38 has the function of a cylinder rod in the travel cylinder 86 and in the main cylinder 82. Where parts come in touch with each other that are movable relative to one another, sealing arrangements (not shown) are made use of in order to prevent leakage of the operating media, for example hydraulic liquid or pressurized air, out of the respective cylinders. It is also prevented that the operating media streams past the respective pistons 84, 88 by sealing arrangements mounted to the pistons 84, 88 and not being illustrated.

In the operating condition shown in FIG. 5, the arrangement is prepared to receive the casting mold 47 having the maximum possible mold fitting height Fmax. In this condition, except for a portion of the reserve path R1, the main piston has been moved close to the mold fixing element 14. The locking element 38 is fully extended, wherein the piston side 90 of the travel piston 88 abuts on the main cylinder 84. The locking force required by the casting mold 47 is generated by the main piston 84 since the travel piston 88 of the travel cylinder 86 bears on the main piston 84. The main cylinder 82 is operated hydraulically with an hydraulic oil and is therefore adapted to absorb the locking forces occurring during the casting process in every position of the main piston 84 in the main cylinder 82.

The operating condition shown in FIG. 6 differs from the operating condition described with reference to the preceding Figure in that, according to the procedure described in FIG. 4, the locking device 54 has been unlocked and the locking element 38 has been retracted into a partially extended position. In this position, when the mold fixing elements 14, are being moved apart from one another by means of the hydraulic cylinders 22, 24 (not shown in this Figure), the casting article can be removed from the casting mold 47. Substantially, the main piston 84 of the main cylinder 82 can remain in its operating condition.

Figure 6:
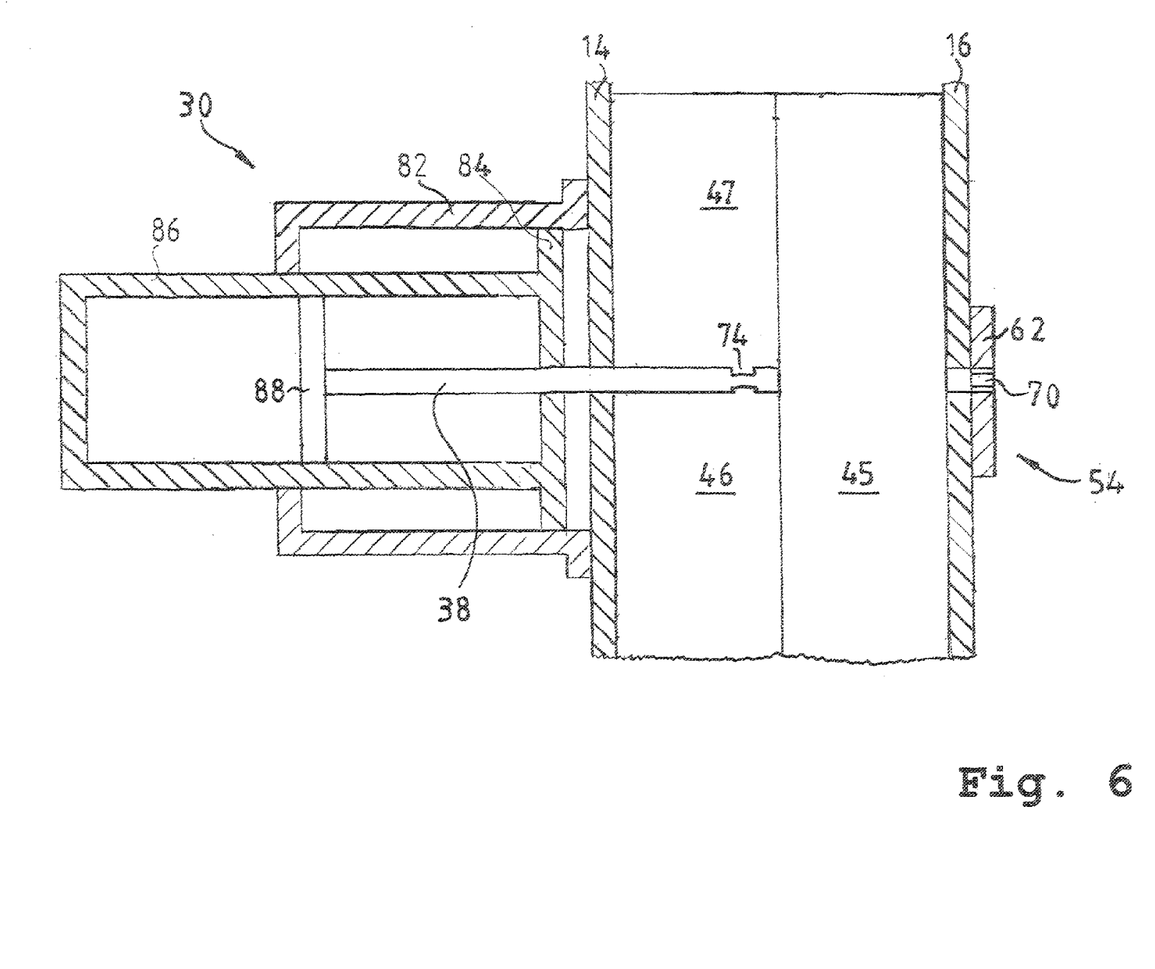
FIG. 6 illustrates a schematic view similar to FIG. 5 in the case of a largest possible casting mold with a partially retracted locking element.
Figure 7:
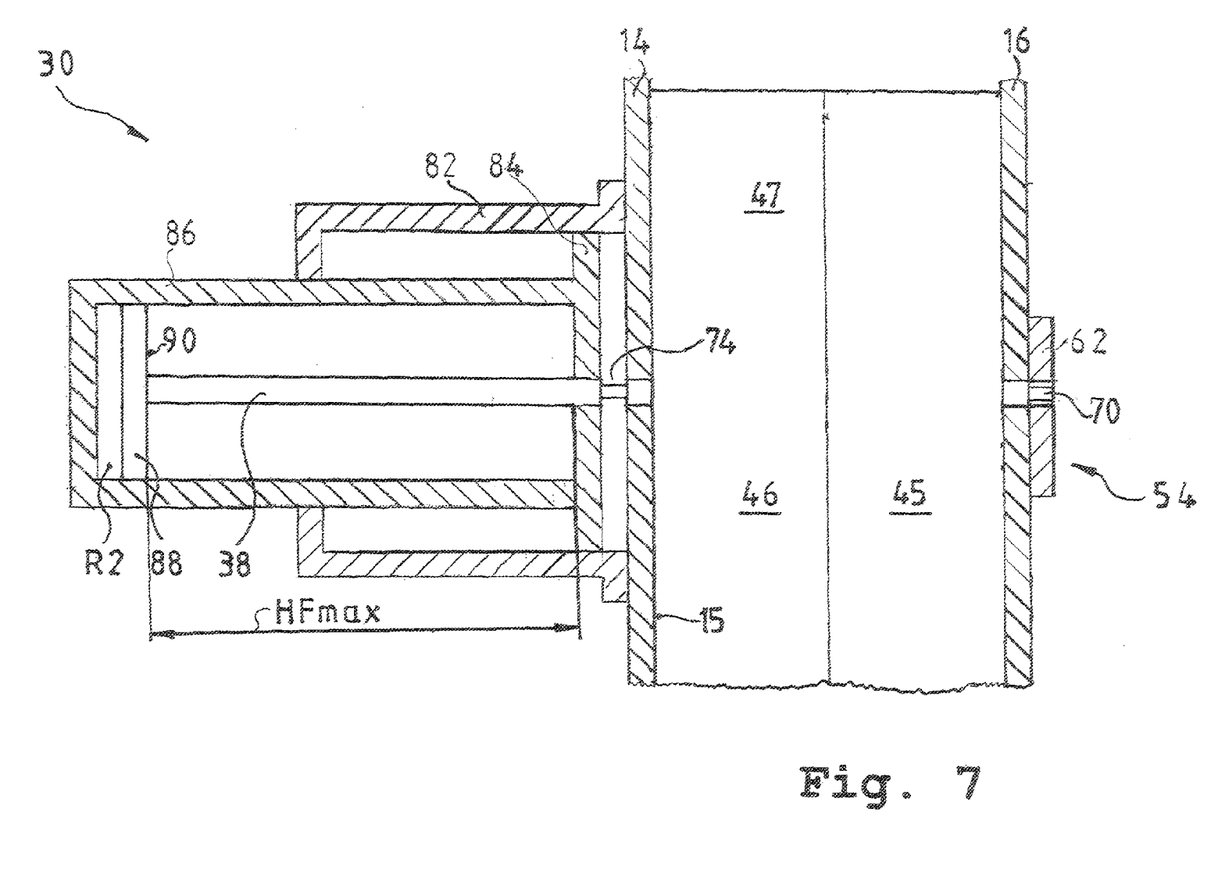
FIG. 7 illustrates a schematic view similar to FIGS. 5 and 6 in the case of a largest possible casting mold with a fully retracted locking element.

In FIG. 7, the locking element 38 has been retracted into a retracted position. This position is notable for the locking element 38 here being flush with the front side 15 of the mold fixing element 14. In this position, the casting mold 47 can easily be changed and be substituted by another casting mold. From a comparison of FIG. 7 with FIGS. 5 and 6 it can be concluded that the main piston 84 of the main cylinder 82 has hardly been moved. In this construction with a largest possible casting mold 47, the maximum stroke HFmax of the travel piston 88 is required. A reserve path R2 in the travel cylinder serves as a clearance for component tolerances of the arrangement 10. The reserve path R2 is in a range of 20 mm to 80 mm, preferably in the range of 30 mm to 50 mm.

Figure 8:
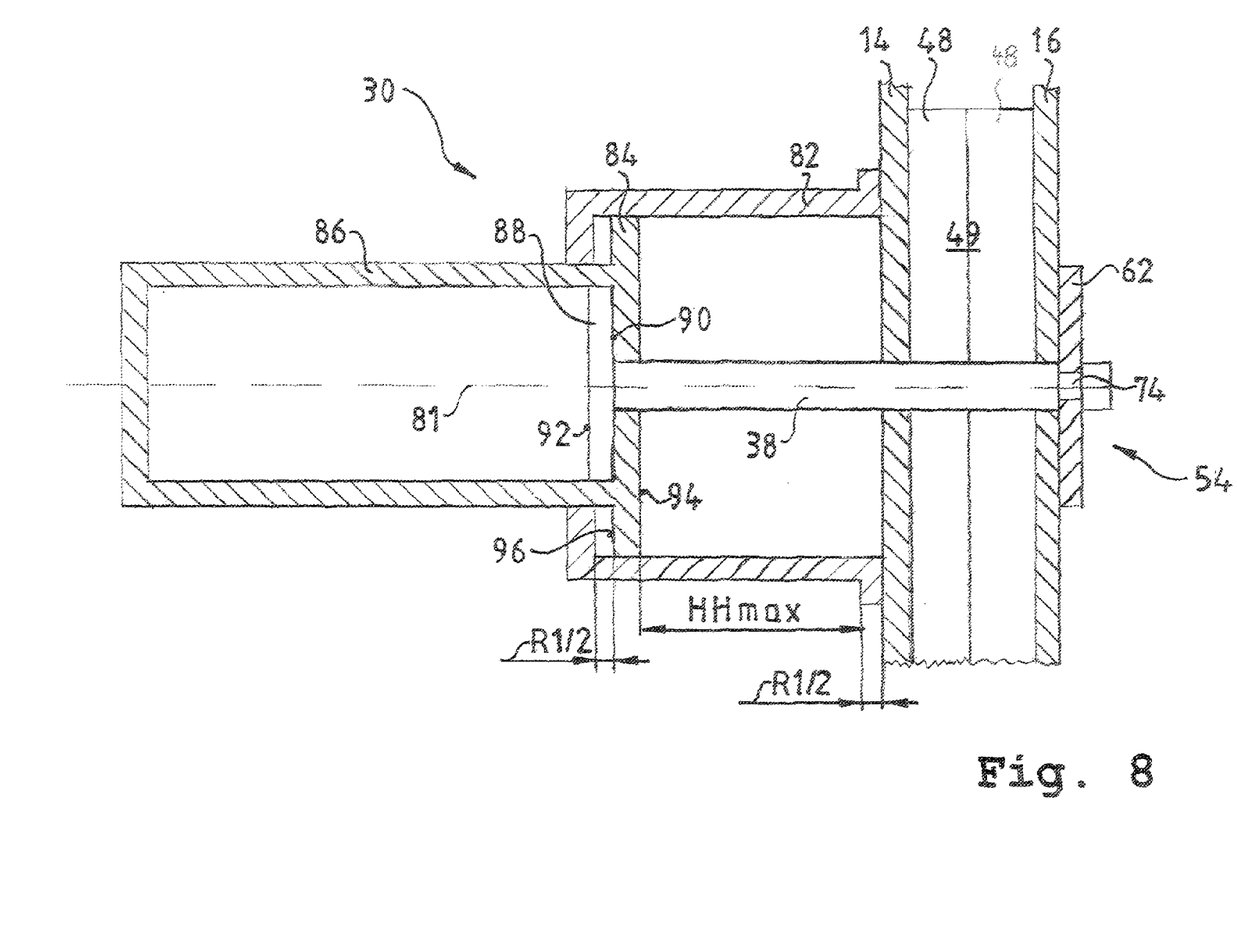
FIG. 8 illustrates a schematic view similar to FIG. 3 in the case of a smallest possible casting mold in the locked condition.

FIG. 8 illustrates a similar condition as shown in FIG. 5. In contrast to FIG. 5, FIG. 8 shows a smallest possible casting mold 49. The main piston 84 has a position with a maximum stroke HHmax. The piston side 90 of the travel piston 88 abuts on the main piston 84 when the locking element 38 has been locked in the locking unit 54 such that the locking forces are transferred by the main piston 84. In order to be able to reliably apply the locking forces by applying pressure to the main piston 84 on its piston side 94, the main piston 84 must not abut on the main cylinder 82 with its cover side 96. Accordingly, here a portion of the reserve path R1 is provided.

Figure 9:
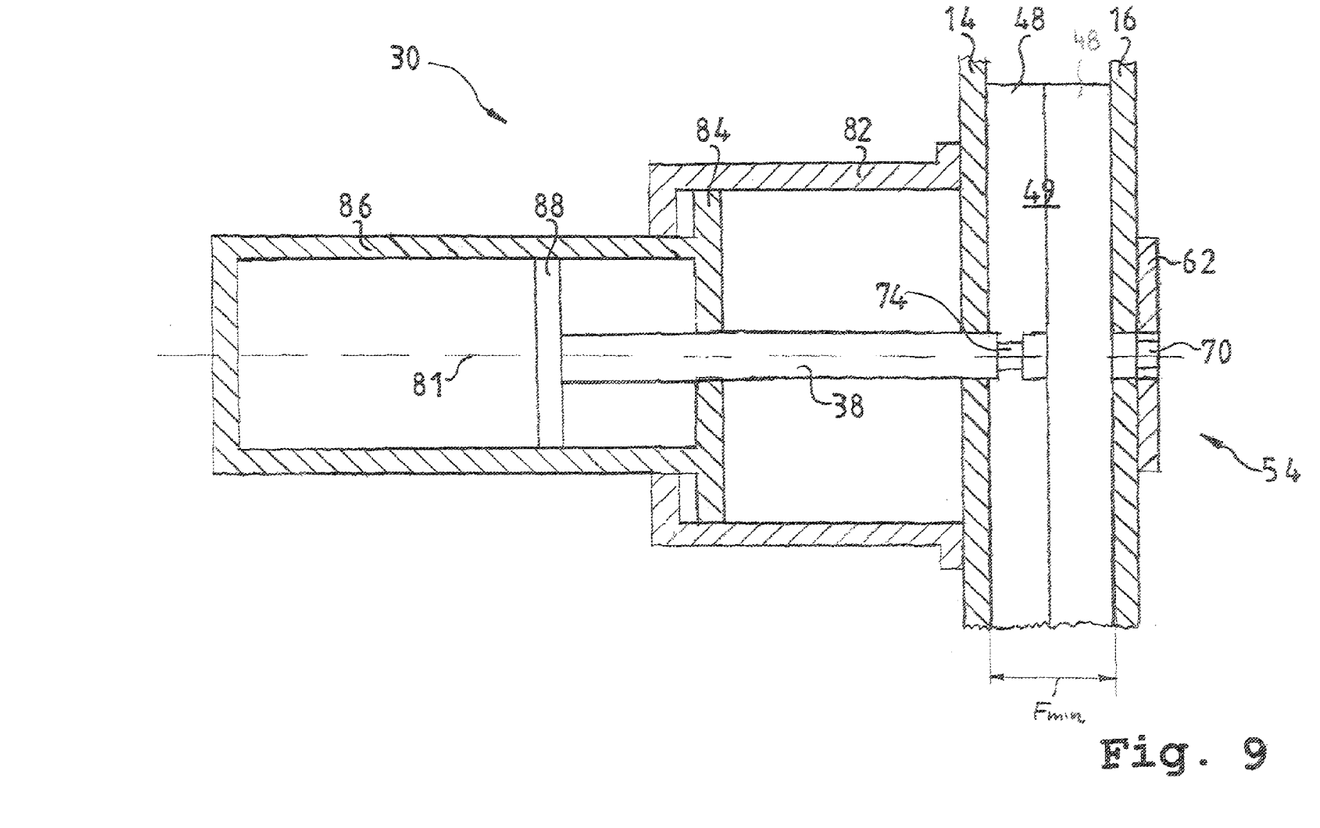
FIG. 9 illustrates a schematic view similar to FIGS. 5 and 6 in the case of a smallest possible casting mold with a partially retracted locking element.
Figure 10:
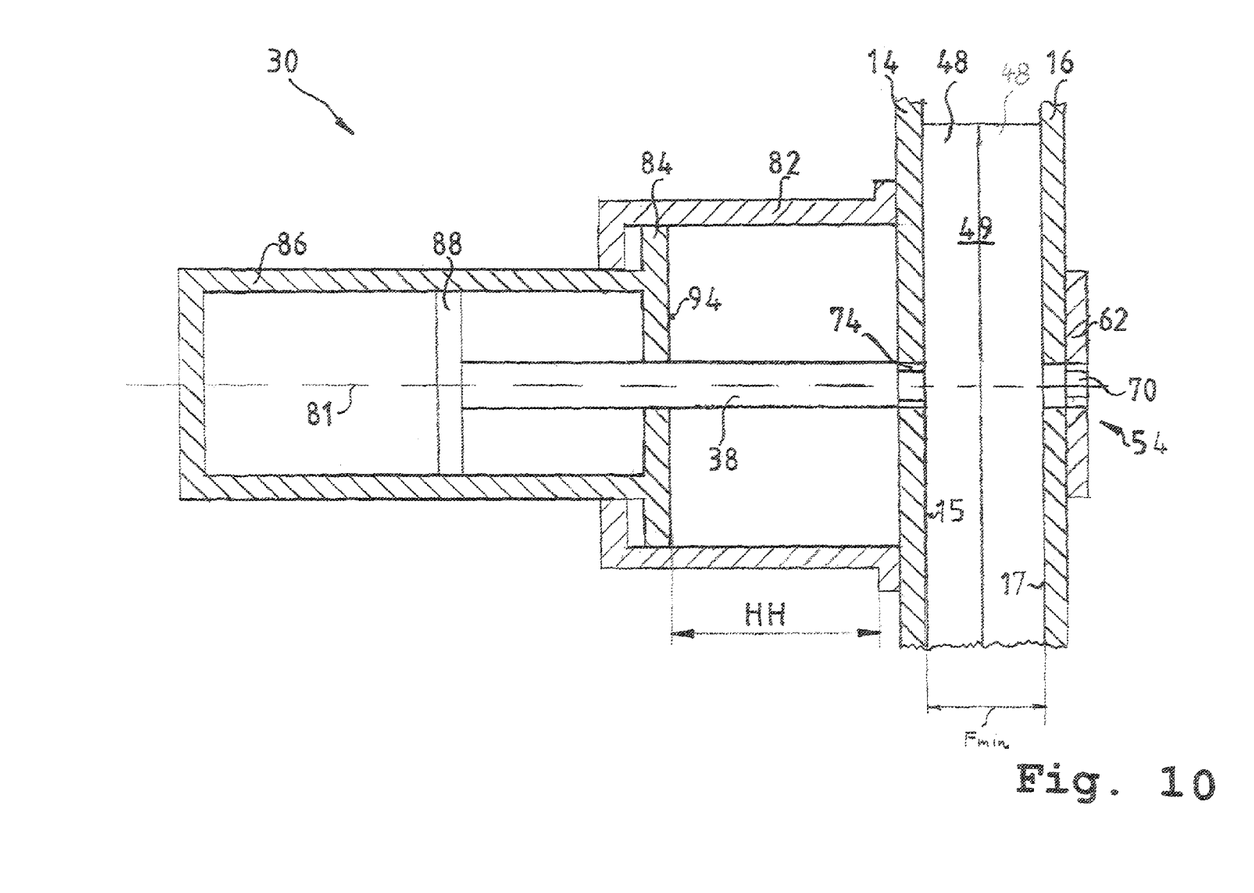
FIG. 10 illustrates a schematic view similar to FIGS. 7 to 9 in the case of a smallest possible casting mold with a fully retracted locking element.

FIGS. 9 and 10, respectively, illustrate the operating conditions shown in FIGS. 6 and 7, respectively, wherein, here the casting mold 49 with the smallest mold fitting height Fmin is concerned. Here, it can be discerned that, comparing the Figures illustrating the same operating condition, which means comparing FIG. 9 with FIG. 6 and FIG. 10 with FIG. 7, respectively, the path traveled by the travel piston 88 is considerably smaller than in the case of casting mold 47 with the largest mold fitting height Fmax.

In the following the description of how to change a casting mold is outlined. With reference to FIGS. 5, 7, 8, 10 the different positions of the main piston 84 in the main cylinder and the travel piston 88 in the travel cylinder 86 are outlined by way of example of the drive 30 of the locking element 38 and the locking device 54. In the example, the casting mold 47 having the maximum mold fitting bight Fmax is substituted by casting mold 49 having the minimum mold fitting height Fmin.

Starting out from the condition shown in FIG. 5, the locking device 54 is unlocked making use of the procedure described above with respect to FIG. 4 and the travel piston 88 of the travel cylinder 86 is moved apart from the main piston 84 by supplying pressurized air on its piston side 90 until the locking element 38 has reached the position illustrated in FIG. 7, in which the locking element 38 disappears in the front side 15 of the mold fixing element 14. To this end, the travel piston 88 travels its maximally required movement path A, which, in the selected example, corresponds with the maximum stroke HFmax. By means of the hydraulic cylinders 22, shown in FIG. 1, the mold fixing elements 14, 16 are moved apart from one another and release the casting mold 47 or the mold halves 45, 46, respectively. The casting mold 47 or the mold halves 45, 46, respectively, are easily removable since the locking element 38 or all of the locking elements 40 to 44, respectively, do no longer impede the removal of this casting mold 47.

As shown in FIG. 10, in the next step, the new casting mold 49 having the smallest possible mold fitting height Fmin is supposed to be set up, to which end, first, the casting mold is positioned between the mold fixing elements 14, 16. Herein, each of the casting mold halves 48 is attached to a respective front side 15, 17 of the two mold fixing elements 14, 16, which mold fixing elements 14, 16 are moved towards each other by means of the hydraulic cylinders 22, 24 until the casting mold 49 is in a closed state. The drive 30 of the locking element 38 is set for the new casting mold 49 by moving the main piston 84 of the main cylinder 82 away from the mold fixing element 14 by supplying hydraulic liquid on its piston side 94 until its stroke HH approximately corresponds with the difference between the mold fitting height of the casting mold used, in the present example the mold fitting height Fmin of the smallest possible casting mold 49, and the mold fitting height Fmax of the largest possible casting mold 47. Preferably, the travel piston 88 of the travel cylinder 86 can be moved simultaneously with the movement of the main piston 84, such that the locking element 38 remains unchanged in its position with regard to the mold fixing element 14.

Figure 11:
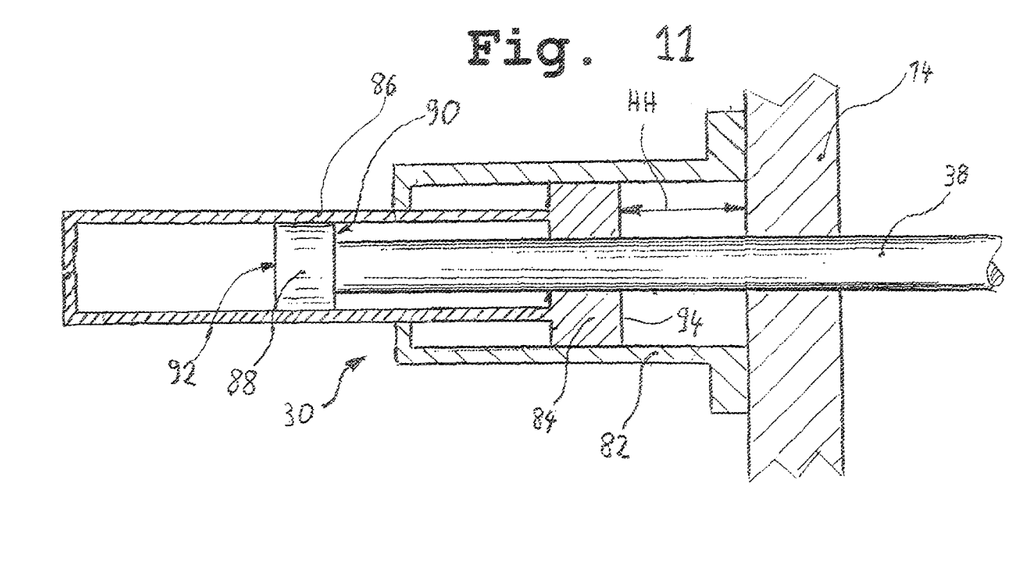
FIG. 11 shows a further sectional view through the drive for the locking element, in which the condition with a partially extended locking element is illustrated.

FIG. 11 shows a condition, in which the main piston 84 of the main cylinder 82 has been adjusted to a considerably smaller casting mold than casting mold 47 having the maximum possible mold fitting bight Fmax, wherein it has however been adjusted to a considerably larger casting mold than casting mold 49 having the smallest possible mold fitting height Fmin. The main piston 84 is adjusted to a central initial position or operating position, starting out from which position it generates the locking force in the case of a closed casting mold. The travel piston 88 of the travel cylinder 86 is located in a central position, in which the locking element 38 is in a partially extended condition. According to the mold fitting height of the casting mold used in this example, the main piston 84 is in an initial position, in which the stroke HH of the main piston 84 is greater than in FIGS. 5 to 7, wherein, however it is still considerably smaller than its maximum possible stroke HHmax.

During the process of closing the casting mold, the locking element 38 is introduced into the locking device 54 of the mold fixing element 16 positioned on the opposite side by the travel piston 88, which in the example is operated pneumatically, of the travel cylinder 86 moving towards the main piston 84 by applying pressure on its cover side 92 until it abuts on the main piston 84 with its piston side 90. The locking element 38, which now is fully extended, is locked in the locking device 54 according to the procedure described with reference to FIG. 4. Subsequently, pressure on the piston side 94 of the main piston 84 is built up until the required locking force for the casting mold is reached. Owing to the mechanical abutment of the piston side 90 of the travel piston 88 on the main piston 84, the locking forces are also transferred even if the travel cylinder 86 is non-pressurized.

In the arrangement 10 described having four locking elements 38 to 44, the other locking elements 40, 42, 44, shown in FIG. 1, become locked in the same way. Thus, substantially the same portion of the locking force is transferred via each of the locking elements 38 to 44.

With reference to FIG. 11, the opening process of the casting mold is described in the following. To this end, first, depressurization of the main cylinder 82 is effected. Then, the locking device 54 is opened in accordance with the procedure described with reference to FIG. 4. Now pressure is applied to the travel cylinder 86 of the travel piston 88 on its piston side 90, such that is thus moved apart from the main piston 84, such that the locking element 38 is thus released from the locking device 54 to be again retractable into the mold fixing element 14. Herein, a movement path is traveled, which is dimensioned such that the front side of the locking element 38 at least has been retracted behind the parting surface of the casting mold, as can be taken from FIG. 9 by way of example. In this condition, the mold fixing elements 15, 16 are moved apart from one another, wherein the casting mold opens and the molded part can be removed.

Then, a preform is supplied to the opened casting mold, the casting mold is closed in the way described and the molding process starts.

In addition to the above described structure, also further embodiments of the arrangement can be advantageous. For example one of the mold fixing elements 14, 16 can be fixedly mounted to the base frame 12, wherein the movement for opening and closing the casting mold is carried out by other mold fixing elements 14, 16. Moreover, the movements of the mold fixing elements 14, 16 can be coupled by means of a compensating mechanism in such a way that they perform a uniform movement of displacement in the direction of arrows P1 and P2 owing to which a synchronous movement for opening and closing is generated. However, providing two separately controllable hydraulic cylinders 22, 24 for displacing the mold fixing elements 14, 16 has the advantage that an asynchronous closing movement of the mold fixing elements 14, is possible, which is advantageous in particular in the production of complicated mold part and object geometries.

Moreover, the invention is not limited to the locking devices 50 to 56 illustrated in FIG. 4. In fact, any suitable locking devices 50 to 56 may be provided for locking the locking element 38 to 44 with the respective mold fixing element 14, 16 on the opposite side, which prevent the locking element 38 to 44 from being withdrawn from out of the opening 58, 60. Further, for locking the locking elements 38 to 44, alternative locking means may be provided, which preferably form-fittingly engage into the locking element 38 to 44. Preferably, a snap-in connection is generated between the locking elements 38 to 44 and a respective at least one mold fixing element 14, 16. Alternatively or additionally also known compression-type couplings for fixedly securing the locking elements 38 to 44 can be provided.

In the arrangement 10 according to FIG. 4, on the whole four locking elements 38 to 44 are provided. The mold fixing elements 14, 16 have a substantially rectangular front side 15, 17, wherein the locking elements 38 to 44, respectively, are arranged diagonally opposite at a lower and an upper corner. In the two respective other diagonally opposite corners, locking devices 50 to 56 for receiving the locking elements 38 to 44 are provided in the mold fixing element 14, 16 respectively arranged on the opposite side. The mold fixing elements 14, 16 are still identically constructed, such that they are interchangeable with one another.

Alternatively, the locking elements 38 to 44 may also be mounted to one of the mold fixing elements 14, 16, wherein in such case, for each of these locking elements 38 to 44 locking devices 50 to 56 are provided at the mold fixing element 14, arranged on the opposite side. In other embodiments, the number of the locking elements 38 to 44 is not specified to be four. Rather, the number of the locking elements 38 to 44 can be varied depending on the mold dimension, the forces occurring during the casting process as well as on the dimensions of the locking elements 38 to 44.

In a further modification of the structure, it might be reasonable to provide a number of locking devices 50 to 56 and locking elements 38 to 44 other than four. However, in this case it has to be made sure that each of the locking elements 38 to 44 is engageable into one locking device 50 to 56.

Instead of the hydraulic cylinders 22, 24 also other hydraulic, pneumatic or electric drives may be provided for displacing the mold fixing elements 14, 16 on the base frame 12.

The structure of the mold fixing elements 14, 16 may also comprise a structural form other than the substantially rectangular shape and may also have more or less than two stiffening elements 26, 28. This predominantly depends on the shape of the casting mold as well as on the locking forces required in the casting process.

The drives 66, 68 of the locking devices 50 to 56 are not limited to an hydraulic drive but may also be realized in a different way, in particular to be electric or pneumatic.

In the illustrated embodiments, the travel piston 88 directly abuts on the main piston 84, 85. It is also possible to mount a stop element to the main piston 84, 85 which then serves as an abutment for the travel piston 88.

LIST OF REFERENCE SIGNS

- 10 arrangement
- 12 base frame
- 14, 16 mold fixing elements
- 15, 17 front side of the mold fixing element 14, 16
- 18, 20, 21 guide rails
- 22, 24 hydraulic cylinder
- 26, 28 stiffening elements
- 30 to 36 drive of locking elements 38 to 44
- 38 to 44 locking element
- 45, 46 half of casting mold with largest possible mold fitting height
- 47 casting mold with largest possible mold fitting height
- 48 half of casting mold with smallest possible mold fitting height
- 49 casting mold with smallest possible mold fitting height
- 50 to 56 locking device
- 58, 60 openings in the mold fixing element 16
- 62, 64 metal plates
- 66, 68 drive of locking elements 54, 56
- 70, 72 openings in the metal plates 62, 64
- 74 to 80 groove
- 81 axis
- 82 main cylinder
- 84, 85 main piston
- 86 travel cylinder
- 88 travel piston
- 90 piston side of the travel piston 88
- 92 cover side of the travel piston 88
- 94 piston side of the main piston 84
- 96 cover side of the main piston 84
- Amax maximum extension height of the locking elements 38 to 44
- Amin minimum extension height of the locking elements 38 to 44
- F1, F2 mold fitting height of a casting mold
- Fmax mold fitting height of the largest casting mold 46
- Fmax/2 half of mold fitting height of the largest casting mold 46
- Fmin/2 half of mold fitting height of the smallest casting mold 48
- HFmax maximum stroke of the travel piston 88
- HH stroke of the main cylinder 82
- HHmax maximum stroke of the main piston 84
- P1, P2 directional arrows
- R1 reserve path of the main piston 84
- R1/2 half of reserve path of the main piston 84
- R2 reserve path of the travel piston 88

The invention claimed is:

1. An arrangement for receiving a multi-part casting mold, comprising:
   a base frame; at least two opposed mold fixing elements arranged on the base frame, at least one of the mold fixing elements being arranged displaceably on the base frame,
   wherein front sides of the mold fixing elements are substantially facing each other and respectively hold at least one casting mold element,
   wherein at least one of the mold fixing elements comprises at least one displaceable locking element, which is displaceable from a first retracted position into a second extended position, in the second extended position the locking element engages into a locking device provided in the opposing mold fixing element and is lockable there; and
   a drive unit for displacing the locking element, the drive unit including a hydraulic main cylinder with a main piston and a pneumatic travel cylinder with a travel piston, wherein the travel cylinder is connected with the main piston of the main cylinder and is movable therewith, wherein the travel piston has a piston rod, which is connected with the locking element and is mounted concentrically and displaceably in the main piston,
   and wherein in an operating condition of a molding process, the travel piston abuts on the main piston, and the main cylinder provides a locking force to keep the mold closed during the molding process, wherein the main cylinder is operated with hydraulic oil and the travel cylinder is operated with pressurized air.

2. The arrangement according to claim 1, wherein in case of a structural form of the arrangement with a minimal mold fitting height and a maximum mold fitting height for a blow or casting mold, the main cylinder is dimensioned so that a maximum stroke of the main piston corresponds with a difference of the maximum mold fitting height and the minimum mold fitting height plus a reserve path.

3. The arrangement according to claim 2, wherein the reserve path is in a range of 20 mm to 80 mm.

4. The arrangement according to claim 3, wherein the reserve path is in a range of 30 mm to 50 mm.

5. The arrangement according to claim 1, wherein in case of a structural form of the arrangement with a maximum mold fitting height for a blow or casting mold, the travel cylinder is dimensioned so that a maximum stroke of the travel piston corresponds with the maximum mold fitting height plus a reserve path.

6. The arrangement according to claim 5, wherein the reserve path is in a range of 20 mm to 80 mm.

7. The arrangement according to claim 6, wherein the reserve path is in a range of 30 mm to 50 mm.

8. The arrangement according to claim 1, wherein a two-part casting mold having two mold halves is provided.

9. The arrangement according to claim 1, wherein the locking element is directly connected with the travel piston.

10. The arrangement according to claim 1, wherein the locking element is connected with the travel piston by a piston rod.

11. A method for operating the arrangement according to claim 1, comprising the steps of; when changing the casting mold, setting up the casting mold by moving the main piston of the main cylinder into an initial position using hydraulic oil, in which the travel piston of the travel cylinder abuts on the main piston in case of a closed casting mold, when the associated locking element engages into the related locking device and is locked there; and
   when closing the casting mold, moving the travel piston of the travel cylinder using pressurized air to such an extent that the travel piston abuts on the main piston, the locking element engages into the related locking device and is locked, and wherein subsequently, pressure is applied to the main cylinder on the piston side so that a locking force for the casting mold in the casting or blow process is provided.

12. The method according to claim 11, wherein, upon opening the casting mold, first, a depressurization is effected on the piston side of the main cylinder, subsequently the locking of the locking device is unlocked, and then the locking element is retracted by moving the travel cylinder behind the front side of the mold fixing element.

\* \* \* \* \*